(12) United States Patent
Roosendaal et al.

(10) Patent No.: US 6,819,386 B2
(45) Date of Patent: Nov. 16, 2004

(54) APPARATUS HAVING A FLAT DISPLAY

(75) Inventors: Sander Jurgen Roosendaal, Eindhoven (NL); Simon Robert Marsh, Zantvoort (NL); Tijsbert Mathieu Henricus Creemers, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 48 days.

(21) Appl. No.: 10/253,285

(22) Filed: Sep. 24, 2002

(65) Prior Publication Data

US 2003/0063243 A1 Apr. 3, 2003

(30) Foreign Application Priority Data

Sep. 28, 2001 (EP) .............................. 01203701

(51) Int. Cl.⁷ ..................... G02F 1/1343; G02F 1/1335

(52) U.S. Cl. ........................................ 349/144; 349/113
(58) Field of Search ................. 349/143–144, 349/113–114, 1, 16

(56) References Cited

U.S. PATENT DOCUMENTS 5,896,575 A * 4/1999 Higginbotham et al. .... 455/566

FOREIGN PATENT DOCUMENTS

| GB | 2090036 A | * | 6/1982 | |
| GB | 2305532 A | | 9/1997 | ............. G09F/9/35 |
| WO | WO 00/36578 | * | 6/2000 | |

* cited by examiner

*Primary Examiner*—Dung Nguyen

(57) ABSTRACT

A transflective display (2) in e.g. the lid of a mobile display is used in the reflective mode in one viewing direction (frontlight) and in the transmissive mode in the other direction (backlight) when the lid is open.

14 Claims, 4 Drawing Sheets

APPARATUS HAVING A FLAT DISPLAY

Figures 1A, 1B:
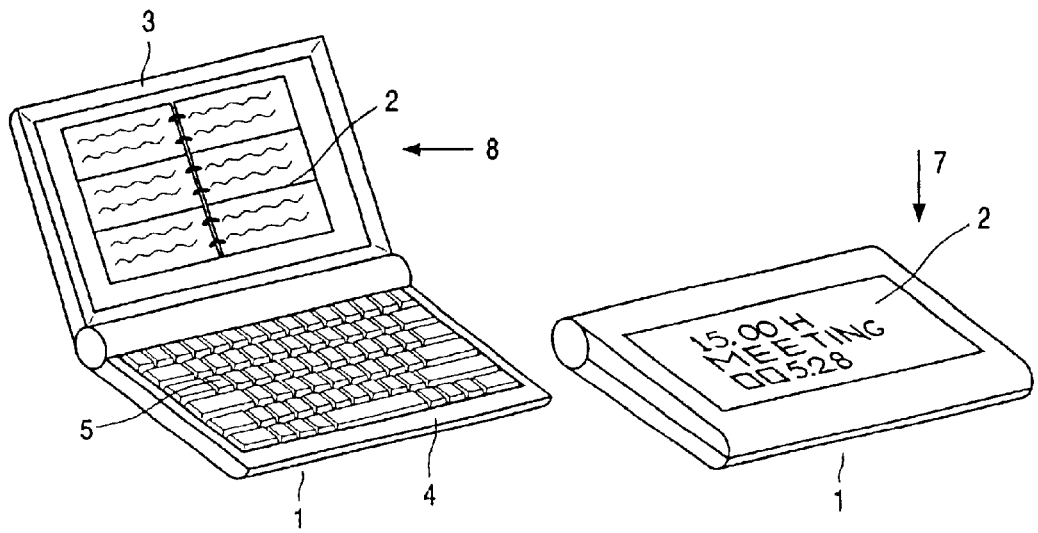

The invention relates to an apparatus comprising a display device having a flat display, provided with means for visualizing images in two planes located on opposite sides of the display. The invention also relates to a display device for such an apparatus.

Examples of such a display device are TFT LCDs or AM LCDs which are used in laptop computers and in organizers, but they also find an increasingly wider application in GSM telephones based on both passive and active drive. Instead of LCDs, display devices based on other effects such as, for example, electroluminescence may also be used.

Electronic apparatus in which the information can be visualized on two sides of the display is increasingly being used, not only in said laptop computers and organizers but also in, for example, cash registers.

In the known apparatuses, two different displays are generally used, one for each of the two viewing sides. It will be evident that this has a considerable cost-increasing effect, even if only two substrates are used for realizing the two displays, as is shown in GB 2,305,232.

It is an object of the present invention to provide a solution by providing the display device with sub-pixels associated with pixels which are visible on both sides of the display, which sub-pixels are provided with electrodes on at least a first substrate, each electrode comprising a transparent and a reflective sub-electrode.

The sub-pixels will usually coincide with pixels although the surface of a pixel intended (and also observed) as a single pixel on one side may comprise a plurality of sub-pixels as observed from the other side.

In a first embodiment, which may be based on light-modulating effects such as LCD effects as well as on emissive effects such as (organic) LEDs, the first substrate and the second substrate are provided with electrodes each comprising a transparent and a reflective sub-electrode, in which, viewed transversely to the substrates, the transparent and the reflective sub-electrode are substantially complementary with respect to each other.

By driving, during viewing from one side, the reflective sub-electrodes with or without simultaneous illumination with a lamp functioning as a frontlight in the embodiment based on light-modulating effects, the display device is used as a reflective display device in one mode.

When viewing from the other side, the transmissive sub-electrodes are driven, in which the same lamp now functions as a backlight.

Another embodiment, based on emissive effects, comprises a light-emitting material between two transparent substrates in which again, viewed transversely to the substrates, the transparent and the reflective sub-electrode are substantially complementary with respect to each other.

By driving, during viewing from one side, the appropriate sub-pixels, light is emitted in the display device in one mode via transmissive sub-electrodes, while light is emitted in the other mode via transmissive sub-electrodes which are complementary therewith on the other side.

These and other aspects of the invention are apparent from and will be elucidated, by way of non-limitative example, with reference to the embodiment(s) described hereinafter.

Figures 2A, 2B:
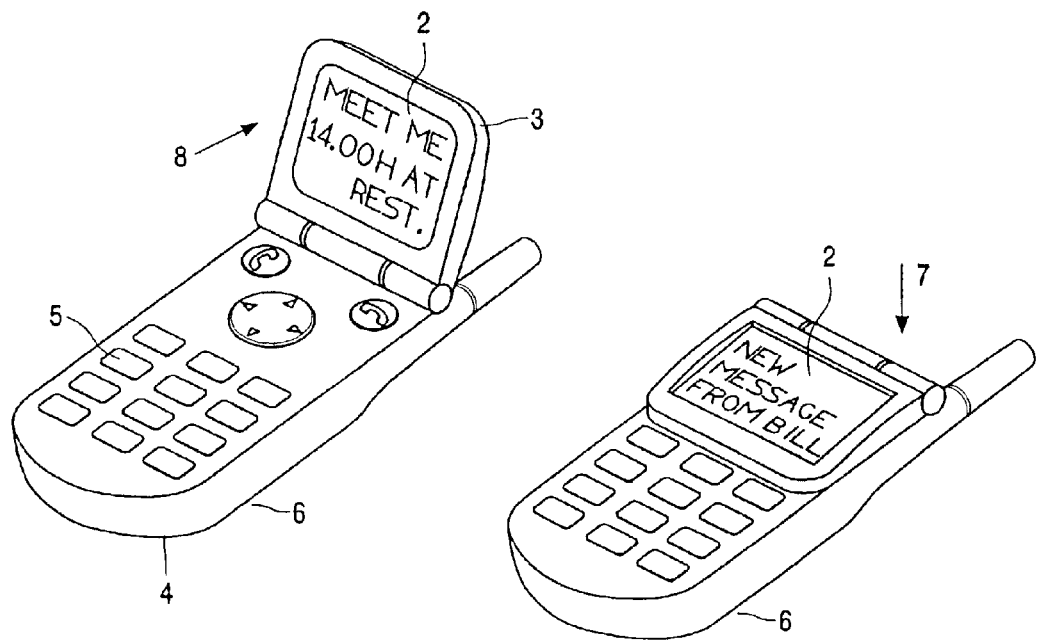
Figure 3:
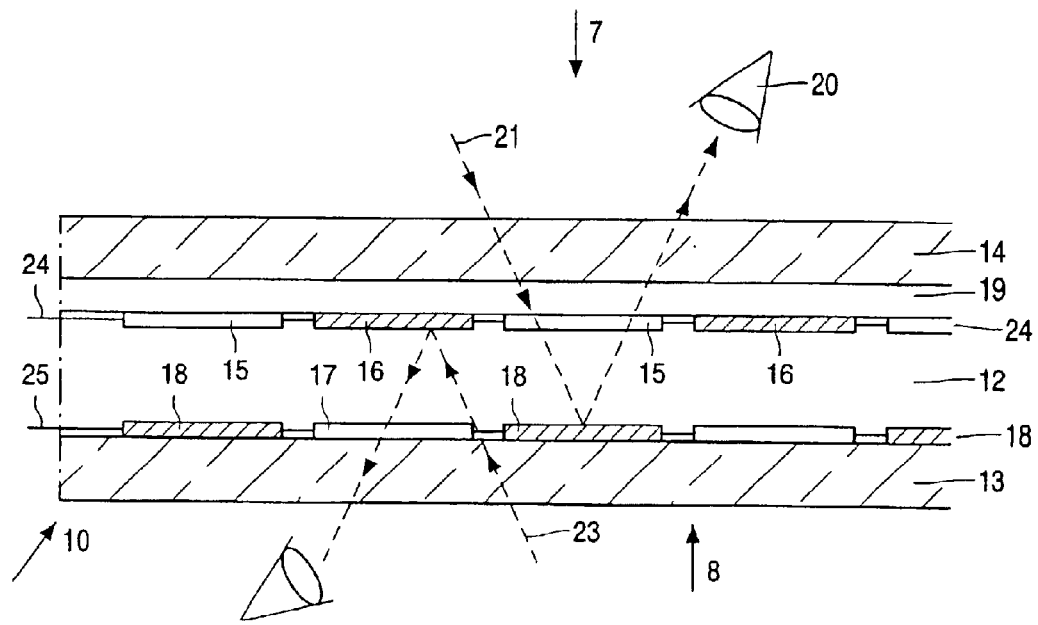
Figure 4:
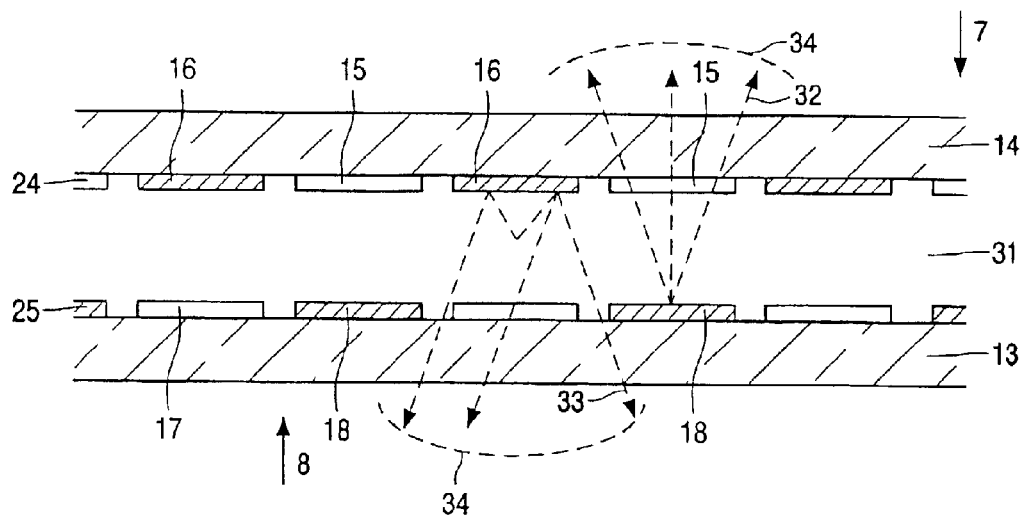
Figure 5:
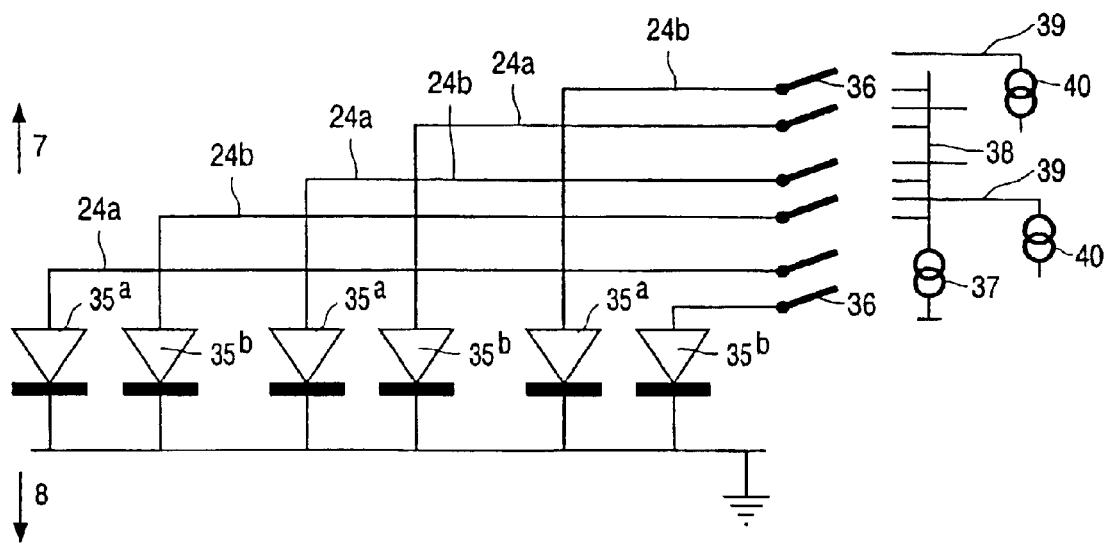
Figure 6:
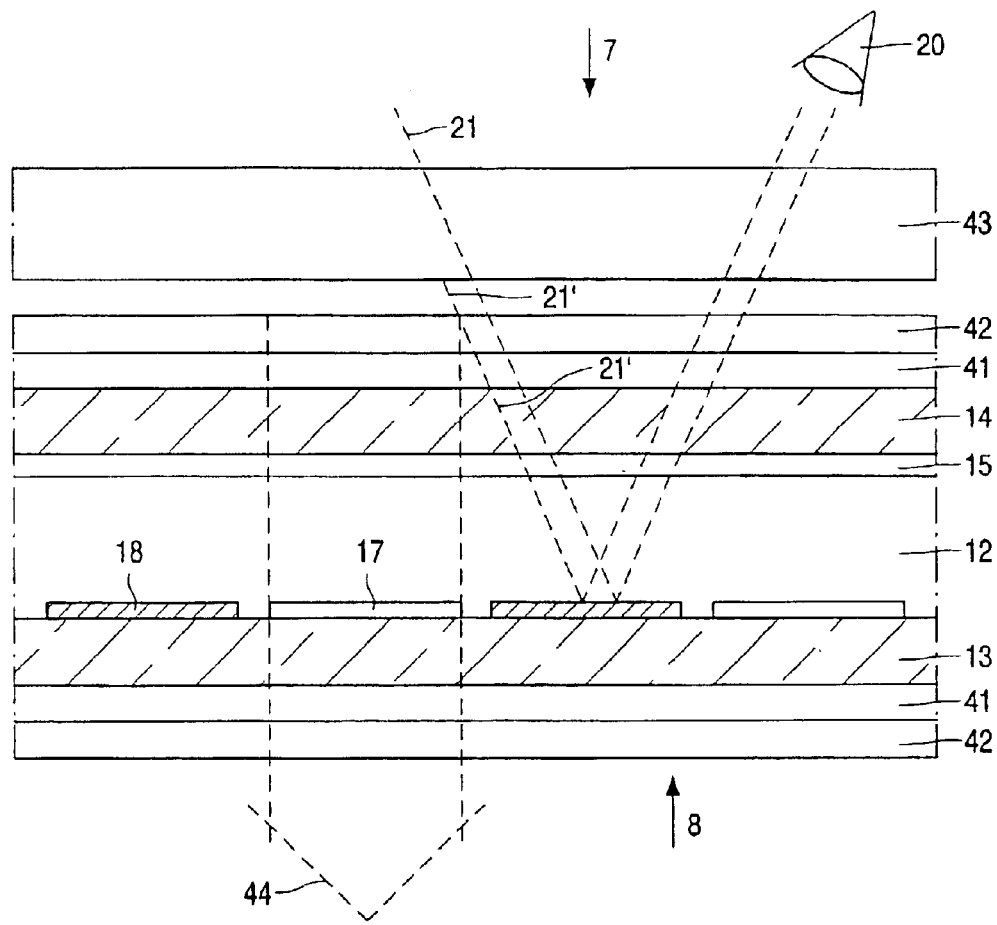
Figure 7:
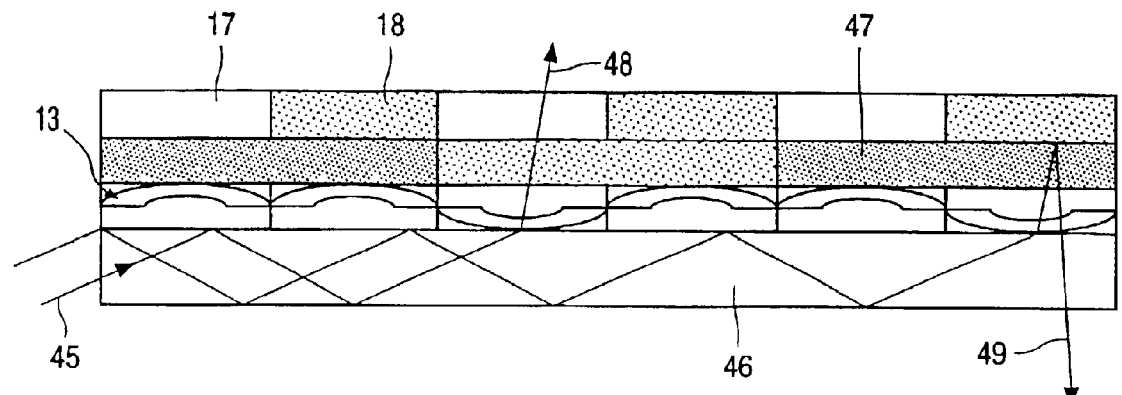
Figure 8:
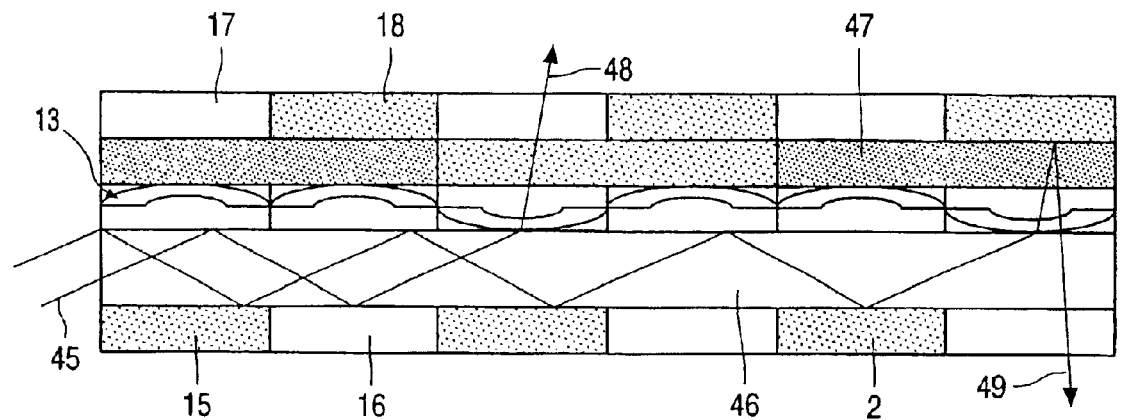

In the drawings:

FIG. 1 shows a first apparatus according to the invention, for example, a personal digital assistant, FIG. 2 shows a mobile telephone according to the invention, FIG. 3 is a cross-section of an LCD display device according to the invention, FIG. 4 is a cross-section of a LED display device according to the invention, FIG. 5 shows the electrical equivalent of FIG. 4, while FIG. 6 is a cross-section of another LCD display device according to the invention, and FIGS. 7 and 8 show a further display device according to the invention.

The Figures are diagrammatic and not drawn to scale; corresponding components are generally denoted by the same reference numerals.

FIG. 1 is a plan view of a personal digital assistant or, for example, a laptop computer 1 with an associated display 2 in a housing 3 which is connected via a hinge to a further housing 4 accommodating further components of the laptop computer 1 such as a keyboard 5 (FIG. 1a) which is not visible in the closed state (FIG. 1b). In the closed state, a viewer sees the other side of the display 2. Similar remarks apply to the mobile telephone 6 shown in FIG. 2.

A liquid crystal display device suitable for such a viewing from two sides is shown in FIG. 3.

FIG. 3 is a diagrammatic cross-section of a part of a light-modulating device 10, in this example with a twisted nematic liquid crystal material 12 which is present between two substrates 13, 14 of, for example, glass, provided with the electrodes 15, 16, 17, 18. If necessary, the device comprises one or more orientation layers 19 which orient the liquid crystal material on the inner walls of the substrates. In this case, the liquid crystal material has a positive optical anisotropy and a positive dielectric anisotropy.

In the relevant example, the first substrate 13 is provided with transparent (picture) electrodes 17 and reflective electrodes 18, while the second substrate 14 is provided with transparent (picture) electrodes 15 and reflective electrodes 16. Facing pairs 17, 16 and 15, 18 of (picture) electrodes jointly define (sub-)pixels together with the intermediate liquid crystal material 12.

During use, for example, in the closed state of the personal digital assistant 1 or the mobile telephone 6, the display is viewed by a viewer from the direction 7, which is diagrammatically indicated by the eye 20 in FIG. 3. Ambient light 21 passes the transparent (for example ITO) electrodes 15 so as to display an image defined by drive signals (diagrammatically denoted by means of the connections 21, 22) on the electrodes 15, 18, dependent on the voltage on the electrodes 15, 18 and after reflection on the electrode 18.

In the same way, the display in the open state is viewed by a viewer from the direction 8, which is diagrammatically indicated by the eye 22 in FIG. 3. Ambient light 23 now passes the transparent electrodes 17 so as to display an image defined by drive signals (diagrammatically denoted by means of the connections 24, 25) on the electrodes 16, 17, dependent on the voltage on the electrodes 16, 17 and after reflection on the electrode 16.

The transparent electrodes 17 on the first substrate 13 have a complementary pattern with respect to the transparent electrodes 19 on the second substrate 14, but also with respect to the reflective electrodes 18 on the first substrate 13 which, in their turn, have a complementary pattern with respect to the reflective electrodes 16 on the second substrate 14. Although they are shown here as single electrodes, the (combined) electrodes will usually have a matrix or chessboard pattern, but other patterns are not excluded. Active drive (by means of TFT transistors or two-pole switches (diodes, MIMs) is alternatively possible.

FIG. 4 is a diagrammatic cross-section of a part of a light-emitting device 30, in this example with a matrix of organic (polymer) LEDs 35 between two substrates 13, 14 of, for example, glass, provided with electrodes 15, 16, 17, 18.

The first substrate 13 is provided again with transparent (sub-)electrodes 17 and reflective electrodes 18, while the second substrate 14 is provided with transparent (picture) electrodes 15 and reflective electrodes 16. Facing pairs 14, 16 and 15, 17 of (picture) electrodes again define (sub-) pixels together with the intermediate emissive material 31.

During use, for example, in the closed state of the personal digital assistant 1 or the mobile telephone 6, the display is viewed from the direction 7. Light 32 generated in the emissive material 31 passes the transparent (for example, ITO) electrodes 15 so as to display an image defined by drive signals (diagrammatically indicated by means of the connections 21, 22) on the electrodes 15, 18, dependent on the voltage on the electrodes 15, 18. The exiting light is shown by means of the cone 34 in FIG. 4. A part of the generated light may exit through the electrodes 15, possibly after reflection on the electrodes 18.

In the same way, the display in the opened state is viewed from the direction 8. Light 33 generated in the emissive material 31 passes the transparent (for example, ITO) electrodes 17 so as to display an image, dependent on the voltage on the electrodes 16, 17. The exiting light is again indicated by means of the cone 34 in FIG. 4.

FIG. 5 is an electrical equivalent of FIG. 4 diagrammatically showing a number of LEDs 35a, 35b whose emitted light is alternately emitted in the direction 7 and in the direction 8. By means of switches 36, a plurality of diodes 35a (sub-pixels) may, if necessary, be connected via a connection 38 to a current source 37 in the case of driving in one of the two directions, while, for example, in the case of driving in the other direction, the diodes 35b (sub-pixels) may, if necessary, be connected separately via connections 39 to current sources 40. The adjustment of the current source or sources determines the grey values of the (sub-) pixels. The resolution, viewed in one direction may thereby be larger than that in the other direction.

FIG. 6 shows a part of a transflective display device with a light-modulating device 10, in this example with a twisted nematic liquid crystal material 12 which is present between two substrates 13, 14 of, for example, glass, provided with electrodes 15, 17, 18. During use, when viewing from the direction 7, the display is viewed again by a viewer from the direction 7, which is diagrammatically indicated by means of the eye 20. Ambient light 21 passes the transparent electrodes 15 so as to display an image defined by drive signals (diagrammatically denoted by means of the connections 21, 22) on the electrodes 15, 18, dependent on the voltage on the electrodes 15, 18 and after reflection on the electrode 18. In the case of insufficient ambient light, the frontlight 43 is switched on; for light 21' coming from the frontlight 43, the same considerations as those for ambient light 21 apply.

When viewing from the direction 8, the same frontlight 43 works as a backlight and a beam 44 is modulated by the liquid crystal element. To this end, the display device 10 is further provided with, for example, compensation foils 41 and polarizers 42. The other reference numerals have the same significance as those in the previous Figures.

FIG. 7 shows a foil display. In this case, the substrate 13 is a switching foil and is provided again with transparent (sub-)electrodes 17 and reflective electrodes 18. Light 45 which is coupled into the waveguide 46 is coupled out when the foil is driven in such a way that it is in optical contact with the waveguide. If the foil is not in optical contact with the waveguide, no light is coupled out. The light which has been coupled out passes a color filter 47 in this example and then arrives on a plate with alternately transparent and (diffusely) reflecting electrodes 17, 18. In the example of FIG. 7, the green pixel is on for one side of the display (beam 48). The light which has been coupled out and is incident on the reflecting electrodes is reflected (beam 49) and provides images on the other side. In FIG. 7, the green pixel is on for one side of the display and the blue pixel is on for the other side of the display. The resolution on both sides of the display device may of course differ.

In FIG. 8, the waveguide on the other side is also provided with a layer of alternating reflective and transparent electrodes 15, 16, which are complementary to the electrode layer on the "upper side". The reflecting electrodes 15 are preferably specularly reflecting because otherwise the light in the waveguide will extend at an angle which is larger than the critical angle so that a part of the light may be coupled out. Also the refractive index of the transparent material is adapted as much as possible so as to prevent unwanted coupling-out.

The invention is of course not limited to the examples described, but several variations are possible within the scope of the invention. Similarly as described with reference to the device of FIG. 5, it is also possible to use pixels of a different format on the different sides in LCD display devices. Fixed icons may also be adjusted.

The protective scope of the invention is not limited to the embodiments described. The invention resides in each and every novel characteristic feature and each and every combination of characteristic features. Reference numerals in the claims do not limit their protective scope. Use of the verb "comprise" and its conjugations does not exclude the presence of elements other than those stated in the claims. Use of the article "a" or "an" preceding an element does not exclude the presence of a plurality of such elements.

What is claimed is:

1. An apparatus comprising a display device having a flat display, provided with means for visualizing at least one image in two planes located on opposite sides of the display, the display being provided with sub-pixels comprised by pixels that are visible on both sides of the display, which sub-pixels are provided with electrodes on at least a first substrate, each electrode comprising a transparent and a reflective sub-electrode.

2. The apparatus of claim 1, wherein the pixels that are visible on both sides of the display have substantially the same dimensions on both sides.

3. The apparatus of claim 1, wherein the first substrate and a second substrate are provided with electrodes each comprising a transparent and a reflective sub-electrode, in which, viewed transversely to the substrates, the transparent and the reflective sub-electrode are substantially complementary with respect to each other.

4. The apparatus of claim 1, comprising an electro-optical material between two transparent substrates that include the first substrate and a second substrate, while the second substrate substantially comprises a transparent electrode at the area of the image to be displayed.

5. The apparatus of claim 4, comprising an illumination source on the side of the display remote from the first substrate.

6. The apparatus of claim 1, wherein the first substrate comprises an optically switching foil.

7. The apparatus of claim 6, said electrodes forming a first pattern of electrodes, the apparatus including:

a waveguide disposed on a side of the first substrate remote from the first pattern of electrodes; and a second pattern of electrodes on the side of the waveguide remote from the first substrate, each electrode of the second pattern of electrodes comprising a transparent and a reflective sub-electrode, such that, viewed transversely to the substrates, the transparent and the reflective sub-electrodes of the two patterns are substantially complementary with respect to each other.

8. A display device comprising means for visualizing at least one image in two planes located on opposite sides of a flat display, the display being provided with sub-pixels comprised by pixels that are visible on both sides of the display, which sub-pixels are provided with electrodes on at least a first substrate, each said electrode comprising a transparent and a reflective sub-electrode.

9. The display device of claim 8, wherein said pixels that are visible on both sides of the display have substantially the same dimensions on both sides.

10. The display device of claim 8 including a second substrate, wherein the first substrate and the second substrate are provided with electrodes each comprising a transparent and a reflective sub-electrode, in which, viewed transversely to the substrates, the transparent and the reflective sub-electrode are substantially complementary with respect to each other.

11. The display device of claim 8, wherein the first substrate comprises an optically switching foil.

12. The display device of claim 11, said electrodes forming a first pattern of electrodes, the device including:

a waveguide disposed on a side of the first substrate remote from the first pattern of electrodes; and a second pattern of electrodes on the side of the waveguide remote from the first substrate, each electrode of the second pattern of electrodes comprising a transparent and a reflective sub-electrode such that, viewed transversely to the substrates, the transparent and the reflective sub-electrode of the two patterns are substantially complementary with respect to each other.

13. A display comprising an electro-optical material between first and second transparent substrates, the second substrate substantially comprising a transparent electrode at the area of an image to be displayed, the display device being provided with sub-pixels comprised by pixels that are visible on both sides of the display, the sub-pixels being provided with electrodes on at least the first substrate, each electrode including a transparent sub-electrode and a reflective sub-electrode.

14. The display device of claim 13, comprising an illumination source on a side of the display remote from the first substrate.

* * * * *